United States Patent
Gratton et al.

(10) Patent No.: US 11,588,869 B2
(45) Date of Patent: Feb. 21, 2023

(54) STREAMING SYSTEM DEVICE AUTHENTICATION SYSTEM AND METHOD

(71) Applicant: Sling TV L.L.C., Englewood, CO (US)

(72) Inventors: Max S. Gratton, Parker, CO (US); Matthew H. Polson, Englewood, CO (US)

(73) Assignee: Sling TV L.L.C., Englewood, CO (US)

( * ) Notice: Subject to any disclaimer, the term of this patent is extended or adjusted under 35 U.S.C. 154(b) by 0 days.

(21) Appl. No.: 17/101,611

(22) Filed: Nov. 23, 2020

(65) Prior Publication Data

US 2022/0166815 A1    May 26, 2022

(51) Int. Cl.
*H04L 65/612*    (2022.01)
*H04L 9/40*    (2022.01)
*H04L 65/80*    (2022.01)

(52) U.S. Cl.
CPC .......... *H04L 65/612* (2022.05); *H04L 63/083* (2013.01); *H04L 63/0853* (2013.01); *H04L 65/80* (2013.01)

(58) Field of Classification Search
CPC ..... H04L 63/10; H04L 63/20; H04L 2209/38; H04L 63/08; H04L 63/0815; H04L 67/10; H04L 67/12; H04L 69/40; H04L 2209/80; H04L 5/0044; H04L 5/0048; H04L 5/0053; H04L 5/0094; H04L 63/102; H04L 67/104; H04L 67/1065; H04L 67/146; H04L 67/148; H04L 67/18; H04L 9/0643; H04L 9/3236; H04L 1/08; H04L 45/308; H04L 47/781; H04L 47/808; H04L 47/824; H04L 63/105; H04L 63/107; H04L 69/22; H04L 69/32; H04L 1/1854; H04L 1/1874; H04L 1/1893; H04L 1/1896; H04L 2001/0097; H04L 45/20; H04L 47/56; H04L 61/1511; H04L 61/302; H04L 63/0281; H04L 63/0853; H04L 63/0884; H04L 67/1002; H04L 67/28; H04L 12/5692; H04L 1/1671; H04L 1/1685; H04L 1/1861; H04L 47/125; H04L 5/0007; H04L 5/0014;
(Continued)

(56) References Cited

U.S. PATENT DOCUMENTS

2010/0107225 A1\* 4/2010 Spencer .................. G06F 21/85
726/4
2016/0142443 A1\* 5/2016 Ting ........................ H04L 63/20
726/1
(Continued)

*Primary Examiner* — Djenane M Bayard
(74) *Attorney, Agent, or Firm* — KW Law, LLP (57) ABSTRACT

Systems, devices and processes are provided to facilitate the authentication of media player devices for media streaming. Specifically, the various embodiments provide a media player device authentication technique that monitors the locations of media player devices to determine a pattern of device co-location with a primary device. The media player devices can then be selectively designated as confirmed devices based on their determined pattern of device co-location with a primary media player device. Those media player devices that are designated as confirmed devices can then be selectively enabled for media streaming. Conversely, media player devices that are not designated as confirmed devices based on a pattern of co-location can be prevented from receiving media streams even when they have the correct login information and password.

20 Claims, 4 Drawing Sheets

(58) Field of Classification Search
CPC ... H04L 5/0035; H04L 5/0051; H04L 5/0055; H04L 5/0058; H04L 5/006; H04L 5/10; H04L 5/14; H04L 61/103; H04L 61/2007; H04L 61/2092; H04L 63/0272; H04L 63/0428; H04L 63/061; H04L 63/0892; H04L 63/164; H04L 67/125; H04L 67/22; H04L 67/306; H04L 67/322; H04L 9/0637; H04L 9/0866; H04L 9/3226; H04L 9/3239; H04L 9/3247; H04L 9/3278; H04L 1/0021; H04L 1/0026; H04L 1/1607; H04L 1/1628; H04L 1/1825; H04L 1/1867; H04L 1/189; H04L 2463/082; H04L 5/003; H04L 63/101; H04L 63/166; H04L 67/327; H04L 69/28; H04L 69/321; H04L 1/00; H04L 1/0027; H04L 1/0028; H04L 1/1887; H04L 12/1407; H04L 1/1642; H04L 12/4633; H04L 12/4641; H04L 41/0668; H04L 41/0806; H04L 41/12; H04L 41/14; H04L 43/04; H04L 43/062; H04L 43/065; H04L 43/0811; H04L 43/0817; H04L 43/0864; H04L 43/0876; H04L 43/10; H04L 45/02; H04L 45/125; H04L 45/22; H04L 45/28; H04L 45/302; H04L 45/306; H04L 45/38; H04L 47/22; H04L 47/24; H04L 47/32; H04L 47/825; H04L 61/1523; H04L 61/2503; H04L 63/083; H04L 12/2827; H04L 2012/2841; H04L 12/2825; H04L 41/0803; H04W 4/029; H04W 4/02; H04W 72/0446; H04W 12/06; H04W 88/06; H04W 72/04; H04W 72/0453; H04W 64/006; H04W 72/1215; H04W 76/28; H04W 4/023; H04W 4/50; H04W 74/085; H04W 4/40; H04W 84/12; H04W 4/12; H04W 64/00; H04W 64/003; H04W 72/042; H04W 24/08; H04W 4/70; H04W 84/18; H04W 4/021; H04W 76/14; H04W 88/08; H04W 12/02; H04W 4/20; H04W 8/20; H04W 12/08; H04W 4/33; H04W 4/80; H04W 48/16; H04W 8/18; H04W 92/18; H04W 4/027; H04W 4/18; H04W 72/0406; H04W 84/042; H04W 12/37

See application file for complete search history.

(56) References Cited

U.S. PATENT DOCUMENTS

2016/0149775 A1* 5/2016 Cheung .................. H04L 67/18
709/224
2016/0337795 A1* 11/2016 Nachman .............. H04W 4/023

* cited by examiner

STREAMING SYSTEM DEVICE AUTHENTICATION SYSTEM AND METHOD

TECHNICAL FIELD

The following discussion generally relates to media streaming systems. More particularly, the following discussion relates to device authentication for media streaming systems.

BACKGROUND

Media streaming systems have recently been implemented to provide a variety of media content to users, including audio and video content. This media content has included video-on-demand (VOD) and television (TV) programming that has traditionally been delivered to viewers over legacy cable and satellite broadcast systems. This media content has also included audio content that has traditionally been delivered via radio and satellite transmission. The media content streamed on media streaming systems can thus be provided by a variety of media content providers, including media content sources, aggregators, and the like. The term "media content providers" thus encompasses cable, satellite, and over-the-top (OTT) TV providers, as well as entities owning or operating media streaming platforms. It is also now commonplace for end users to placeshift media content stored in memory contained in or accessible to a home media receiver, such as a set top box (STB) located at the end user's residence, over a network for viewing on a smartphone, tablet, or other portable media receiver operated by the end user. In each case this media content is now commonly being provided via a media streaming system to a variety of user devices, including video player devices.

One issue in the providing of such media streaming systems is user authentication. Traditionally, most media streaming systems have used a combination of user name and password to authenticate user devices for streaming to those devices. Thus in these systems media streaming is only allowed to those devices with the correct username and password. Unfortunately, such use of passwords for authentication is inherently insecure, and thus relying only on passwords can allow access by many unauthorized users. For example, passwords are commonly intercepted or otherwise obtained illicitly. In other cases passwords can be deliberately shared with people that should not be authorized to use the streaming system. In any of such cases the improper use of the media streaming system can result in significant lost revenue to the media content providers.

Thus, there is a continuing need for improved techniques for the authentication of user devices in streaming media systems. Other desirable features and characteristics will become apparent from the subsequent detailed description and the appended claims, taken in conjunction with the accompanying drawings and this background section.

BRIEF SUMMARY

The various embodiments descried herein provide systems, devices, methods and/or processes to improve the authentication of media player devices for media streaming. Specifically, the various embodiments provide a media player device authentication technique that monitors the locations of media player devices to determine a pattern of device co-location with a primary device. The media player devices can then be selectively designated as confirmed devices based on their determined pattern of device co-location with a primary media player device. Those media player devices that are designated as confirmed devices can then be selectively enabled for media streaming. Conversely, media player devices that are not designated as confirmed devices can be prevented from receiving media streams. By enabling media streaming to only those media player devices that are confirmed based on a pattern of co-location with a primary device, the prevalence of illicit media streaming by users with improperly obtained passwords can be greatly reduced.

For example, the monitoring of locations of the media player devices and the determination of patterns of co-location with a primary device can be used to reliably determine which media player devices are likely operated by persons of the same household and thus for which sharing a media streaming account is proper. Stated another way, the technique can be used to identify media player devices that are likely being illicitly used by users not part of the same household and media streaming for such devices can be selectively disabled.

In one example embodiment, a media player device authentication method is provided. In such an embodiment the method comprises: designating a first media player device as a primary device; monitoring locations of a plurality of media player devices to determine patterns of device co-location with the primary device for the plurality of media player devices, the plurality of media player devices including at least a second media player device; selectively designating media player devices in the plurality of media player devices as confirmed devices responsive to a corresponding pattern of device co-location with the primary device meeting first criteria for device co-location; and selectively enabling media streaming to the confirmed devices in the plurality of media player devices.

A further example may be implemented wherein the first media player device is a fixed-position media player device. A further example may be implemented wherein the first media player device is a mobile media player device. A further example may be implemented wherein the monitoring locations of a plurality of media player devices to determine the patterns of device co-location comprises determining an amount of co-location time between at least the first player device and the second player device over a period of time. A further example may be implemented wherein the monitoring locations of a plurality of media player devices to determine the patterns of device co-location comprises determining an average of co-location time between at least the first media player device and the second media player device over multiple of periods of time. A further example may be implemented wherein the monitoring locations of a plurality of media player devices to determine the patterns of device co-location comprises determining an amount of co-location time between at least the first player device and the second player device over a ratio of periods of time.

A further example may be implemented further comprising monitoring locations of the plurality of media player devices to determine a pattern of device co-location between the second media player device and a third media player device, and further comprising selectively designating the third media player device as a confirmed device responsive to the determined pattern of device co-location between the second media player device and the third media player device meeting the first set of criteria for device co-location and the second media player device having been previously confirmed. A further example may be implemented wherein the second media player device is a mobile media player device and further comprising confirming the third media player device responsive to the third media player device being a fixed-position media player device. A further example may be implemented further comprising not confirming the third media player device responsive to the third media player device being a mobile media player device. A further example may be implemented further comprising selectively enabling media streaming to non-confirmed devices in the plurality of media player devices responsive to a location type of the media player device comprising an educational institution or a vacation location.

A further example may be implemented wherein the selectively designating media player devices in the plurality of media player devices as confirmed devices responsive to a corresponding pattern of device co-location with the primary device meeting first criteria for device co-location comprises utilizing reduced criteria of device co-location responsive to a location type of the media player device comprising an educational institution or a vacation location. A further example may be implemented wherein the monitoring locations of each of a plurality of media player devices to determine a pattern of device co-location for the plurality of media player devices utilizes at least one of global positioning system (GPS), internet protocol (IP) address, and wireless signal location. A further example may be implemented further comprising selectively disabling streaming to media player devices in the plurality of media player devices that are not confirmed after period of time from initial use.

In another example embodiment, an automated process executable by a streaming server in communication with media player devices over a network is provided, the automated process comprising: designating a fixed-position media player device as a primary device; determining a location of the primary device; monitoring locations a plurality of mobile media player devices to determine patterns of device co-location with the primary device; selectively designating mobile media player devices in the plurality of mobile media player devices as confirmed mobile devices responsive to at least one determined pattern of device co-location with the primary device meeting first criteria for device co-location; monitoring locations of the confirmed mobile devices to determine patterns of device co-location with a second fixed-position media player device to determine patterns of device co-location with the second fixed-position media player device; selectively designating the second fixed-position media player device as a confirmed fixed-position device responsive to at least one determined pattern of device co-location with the second fixed-position media player device meeting second criteria for device co-location; and selectively enabling streaming to the confirmed mobile devices and the confirmed fixed-position device while selectively disabling streaming to media player devices in the plurality of media player devices that are not confirmed after period of time from initial use.

In another embodiment, an authentication server in communication with a plurality of media player devices over a network is provided, the authentication server comprising a processor and a memory, wherein the processor is configured to perform an automated process by executing digital instructions stored in the memory, wherein the automated process comprises: designating a first media player device as a primary device; monitoring locations of a plurality of media player devices to determine patterns of device co-location with the primary device for the plurality of media player devices, the plurality of media player devices including at least a second media player device; selectively designating media player devices in the plurality of media player devices as confirmed devices responsive to a corresponding pattern of device co-location with the primary device meeting first criteria for device co-location; and selectively enabling media streaming to the confirmed devices in the plurality of media player devices.

Various additional examples, aspects and other features are described in more detail below.

BRIEF DESCRIPTION OF THE DRAWING FIGURES

Exemplary embodiments will hereinafter be described in conjunction with the following drawing figures, wherein like numerals denote like elements, and.

DETAILED DESCRIPTION

The following detailed description of the invention is intended to provide various examples, but it is not intended to limit the invention or the application and uses of the invention. Furthermore, there is no intention to be bound by any theory presented in the preceding background or the following detailed description.

The various embodiments described herein provide systems, devices, methods and/or processes to improve the authentication of media player devices for media streaming. Specifically, the various embodiments provide a media player device authentication technique that monitors the locations of media player devices to determine a pattern of device co-location with a primary device. The media player devices can then be selectively designated as confirmed devices based on their determined pattern of device co-location with a primary media player device. For example, by comparing the determined patterns to criteria for device co-location.

Those media player devices that are designated as confirmed devices can then be selectively enabled for media streaming. Conversely, media player devices that are not designated as confirmed devices based on a pattern of co-location can be prevented from receiving media streams even when they have the correct login information and password. By enabling media streaming to only those media player devices that are confirmed based on a pattern of co-location with a primary device, the prevalence of illicit media streaming by users with improperly obtained login information and passwords can be greatly reduced.

For example, the monitoring of locations of the media player devices and the determination of patterns of co-location with a primary device can be used to more reliably ascertain which media player devices are likely operated by persons residing in or otherwise part of the same household (or other similar entity) for which sharing a media streaming account is proper under the rules of the streaming service provider. Stated another way, the technique can be used to identify media player devices that are likely being illicitly used by persons who are not part of the same household as the primary device and media streaming for such devices can be selectively disabled even when those devices have the correct user ID and password.

To further facilitate this determination in some embodiments the monitored patterns of co-location can be expanded to determine patterns of co-locations of other media player devices with previously confirmed, non-primary devices. This can allow media player devices that are never co-located with the primary media player device to nevertheless be confirmed in certain circumstances. Again, this can be implemented in a way that identifies media player devices that are likely operated by persons of the same household and likely excludes media player devices operated by persons not in the same household.

Figure 1:
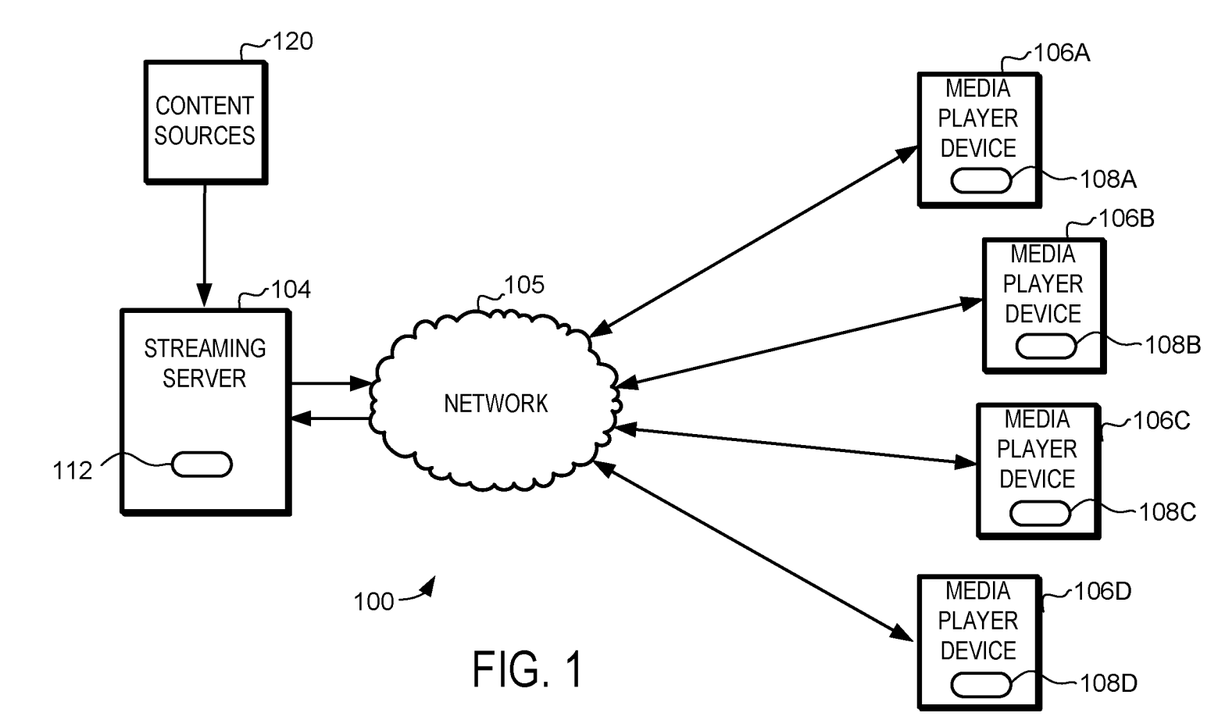
FIG. 1 is a diagram of an example media streaming system that includes a plurality of media player devices.

Turning now to the drawings and with initial reference to FIG. 1, a media streaming system 100 suitably includes a streaming server 104 and a plurality of media player devices 106A-D. In general, the streaming server 104 receives media content from one or more content sources 120, and transmits that media content through the network 105 to the media player devices 106A-D in the form of a data stream that can be received, processed, and presented to the user at the media player devices 106A-D. For example, the media content can include both audio and video content. In the video context, the streaming server 104 transmits that video content through the network 105 to the media player devices 106A-D in the form of a video stream that can be received, processed, and displayed at the video player devices 106A-D.

The content sources 120 can be any type of media content source, including media providers, content aggregators or distributors such as a cable television system operator, a direct broadcast satellite (DBS) system operator, satellite radio operator, or simply a network service provider or the like. These content sources 120 can provide the media content to the streaming server 104 in any suitable form and by any suitable technique. For example, the media content can be provided via satellite, fiber optic or any other conventional wireless or physical media for transmitting signals. The transmitted signals can be received, demodulated and decoded as needed by any appropriate receiver(s) to extract program signals. The extracted programming signals can then be analyzed as appropriate to identify the program contents. A distributor/aggregator, for example, may encode the extracted signals for distribution on a digital network, for aggregation and redistribution of signals over a DBS or cable distribution system, for generating content stored on a remote storage digital video recorder (RSDVR) or video on demand (VOD) service, or for any other purpose.

This content can then be passed to the streaming server 104. Having received this content, the streaming server 104 can encode the received content into a suitable format streaming to the media player devices 106A-D. For example, the streaming server 104 can transmit an encoded data stream via a content delivery network (CDN) for distribution on network 105 (e.g., the Internet) as part of an RSDVR, VOD or other media streaming service. The media streams are thus transmitted to the media player devices 106A-D.

In general, each of the video player devices 106A-B includes a combination of hardware and/or software needed to receive, process, and play the video streams received from the streaming server 104. As examples, each of the video player devices 106A-B can be implemented to include a streaming application stored in memory and being executed by a suitable processor. As some specific examples, each of the media player devices 106A-D can be implemented with any suitable computing device, including laptops, tablets, virtual reality (VR) devices, and mobile communication devices (e.g., smart phones). Such devices may include an integrated display screen, may be coupled to a separate display screen, or may not include a display screen for audio only devices.

In one example embodiment, the media streaming system 100 is implemented to perform one or more automated processes during the streaming of media content from the streaming server 104 to the plurality of media player devices 106A-D. An example of such an automated process is described below with reference to FIG. 2.

In accordance with the embodiments described herein the streaming system 100 and media player devices 106A-D interact to implement a media player device authentication technique that monitors the locations of media player devices 106A-D to determine a pattern of device co-location with a primary device (where the primary device is one of the media player devices 106A-D, (e.g., media player device 106A). The other media player devices (e.g., media player devices 106B-D) can then be selectively designated as confirmed devices based on their determined pattern of device co-location with a primary media player device (e.g., media player device 106A)

Those media player devices 106B-D that are designated as confirmed devices can then be selectively enabled for media streaming. Conversely, media player devices 106B-D that are not designated as confirmed devices based on a pattern of co-location can be prevented from receiving media streams even when they have the correct login information and password. By enabling media streaming to only those media player devices 106B-D that are confirmed based on a pattern of co-location with a primary media player device 106A, the prevalence of illicit media streaming by users with improperly obtained login information and passwords can be greatly reduced.

In one specific embodiment, an automated process (or other implemented method) is executable by the streaming server 104 in communication with the media player devices 106A-D. In other embodiments the automated process can be executed by an authentication server in communication with the streaming server 104 and/or the media player devices 106A-D. In various embodiments this authentication server can be implemented as part of the streaming server 104 (e.g., with an authentication server program 112) or as part of separate authentication server system from the streaming server 104.

In such an embodiment the method comprises: designating a first media player device 106A as a primary device; monitoring locations of a plurality of media player devices 106B-D to determine patterns of device co-location with the primary device for the plurality of media player devices, the plurality of media player devices including at least a second media player device; selectively designating media player devices in the plurality of media player devices 106B-D as confirmed devices responsive to a corresponding pattern of device co-location with the primary device meeting first criteria for device co-location; and selectively enabling media streaming to the confirmed devices in the plurality of media player devices 106B-D.

In one embodiment, the first media player device 106A that is designated as a primary device is a fixed-position media player device. In another embodiment, the first media player device 106A that is designated as a primary device is a mobile media player device.

In one embodiment, the monitoring locations of a plurality of media player devices 106B-D to determine patterns of device co-location comprises determining an amount of co-location time between at least the first player device 106A and the second player device 106B over a period of time. In another embodiment, the monitoring locations of a plurality of media player devices 106B-D to determine the patterns of device co-location comprises determining an average of co-location time between at least the first media player device 106A and the second media player device 106B over multiple periods of time. In yet another embodiment, the monitoring locations of a plurality of media player devices 106B-D to determine the patterns of device co-location comprises determining an amount of co-location time between at least the first media player device 106A and the second media player device 106B over a ratio of periods of time.

In another embodiment, the method further comprises monitoring locations of the plurality of media player devices 106B-D to determine a pattern of device co-location between the second media player device 106B and a third media player device 106C, and further comprising selectively designating the third media player device 106C as a confirmed device responsive to the determined pattern of device co-location between the second media player device 106B and the third media player device 106D meeting the first set of criteria for device co-location and the second media player device having been previously confirmed. In such an embodiment, the second media player device 106B can be a mobile media player device and the method can further comprise confirming the third media player device 106C responsive to the third media player device 106C being a fixed-position media player device. Likewise, in such an embodiment, the method can further comprise not confirming the third media player device 106C responsive to the third media player device 106C being a mobile media player device.

In another embodiment, the method can further comprise selectively enabling media streaming to non-confirmed devices in the plurality of media player devices 106B-D based at least in part on a location type of the media player device. For example, the method can further comprise selectively enabling media streaming to non-confirmed devices in the plurality of media player devices 106B-D responsive to a location type of the media player device comprising an educational institution or a vacation location.

In another embodiment, the method can comprise selectively designating media player devices in the plurality of media player devices 106B-D as confirmed devices responsive to the determined patterns of device co-location with the primary device meeting first criteria for device co-location comprises utilizing a reduced pattern of device co-location responsive to a location type of the media player device comprising an educational institution or a vacation location.

In another embodiment, the method can comprise monitoring the locations of each of a plurality of media player devices 106B-D to determine a pattern of device co-location for the plurality of media player devices utilizes at least one of global positioning system (GPS), internet protocol (IP) address, wireless signal location, etc.

In another embodiment, the method can further comprise selectively disabling streaming to non-confirmed devices in the plurality of media player devices 106B-D. In such an embodiment, the method can further comprise selectively disabling streaming to media player devices in the plurality of media player devices 106B-D that are not confirmed after period of time from initial use.

Figure 2:
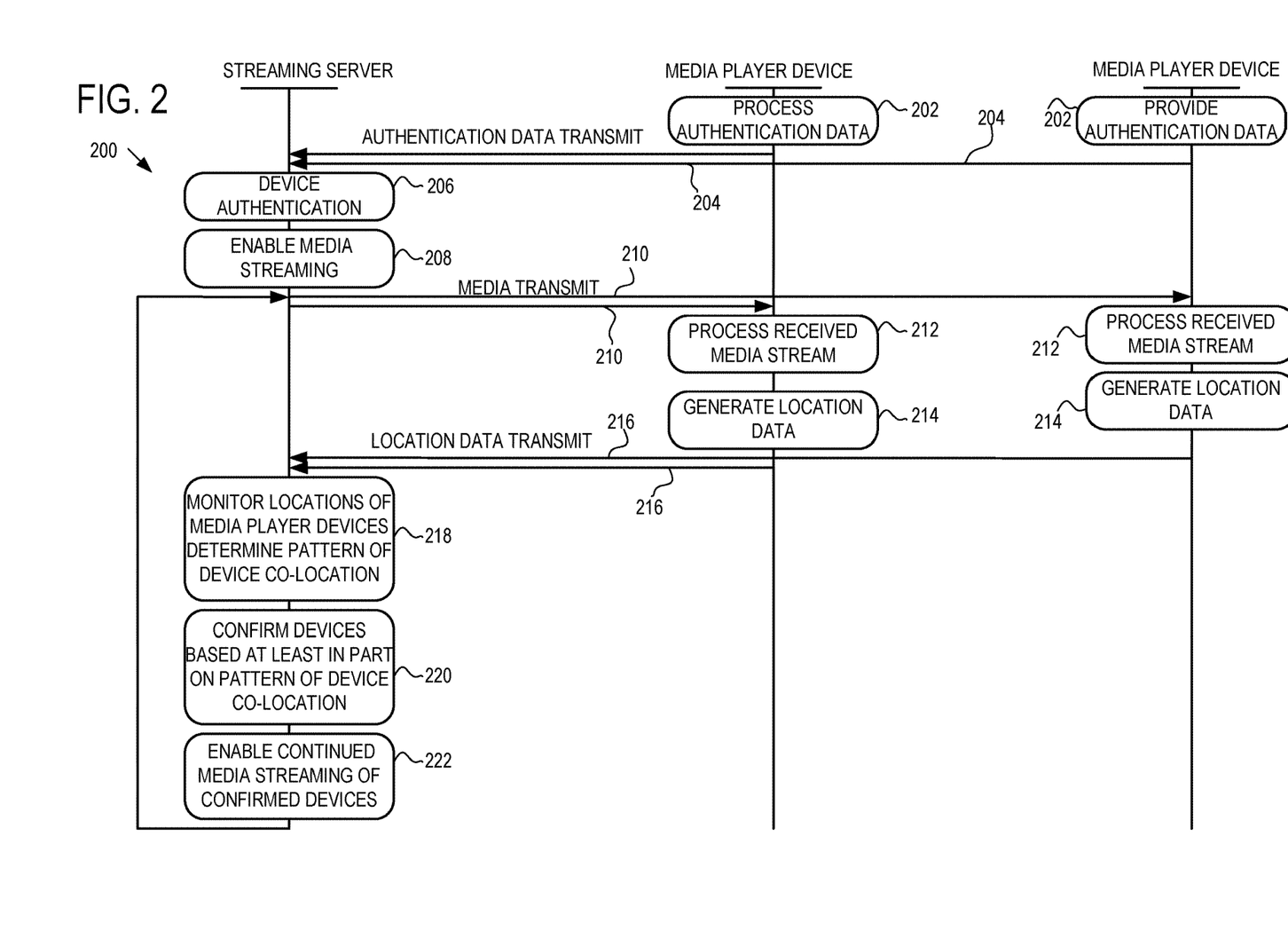
FIG. 2 is a flowchart showing various processes executable by various devices in a streaming media system in accordance with an embodiment.

Turning now to FIG. 2, a process flow diagram 200 illustrates various example processes and data flows that can be automatically executed by a streaming server (e.g., streaming server 104) in a media streaming system (e.g., media streaming system 100) that includes one or more media player devices (e.g., media player devices 106A-D). Specifically, the process flow diagram 200 illustrates a process flow between an exemplary streaming server and exemplary media player devices that monitors the locations of media player devices to determine a pattern of device co-location with a primary media player device. The media player devices can then be selectively designated as confirmed devices based on their determined pattern of device co-location with a primary media player device. For example, by comparing the determined patterns to criteria for device co-location. Those media player devices that are designated as confirmed devices are then enabled for continued media streaming, while media player devices that are not designated as confirmed devices based on a pattern of co-location are prevented from continuing to receive media streams. By enabling media streaming to only those media player devices that are confirmed based on a pattern of co-location with a primary media player device, the prevalence of illicit or otherwise undesirable media streaming by users with improperly obtained login information and passwords can be greatly reduced.

To facilitate the process flow, communications between the various devices can be initiated and established in any suitable manner. For example, communication between the various devices and networks may be established using Internet or other protocols that can include both wireless networking systems (e.g., Wi-Fi) or wired networking systems (e.g., Ethernet or HDMI).

At process steps 202 the media player devices each processes authentication data. In performing this step a wide variety of types of authentication data can be used, such as user IDs and passwords, account numbers, personal identification numbers (PIN) and biometrically derived information. As non-limiting examples, process steps 202 can involve a variety of actions, including prompting a user for a user ID and password, or retrieving a previously stored user ID and password. This and other processed authentication data can then be packaged (e.g., encoded and/or encrypted) and transmitted to the streaming server at authentication data transmit steps 204 using any suitable technique.

At process step 206 the streaming server authenticates the media player device(s) using the transmitted authentication data. Again, this step can be performed using any suitable technique. For example, the authentication data transmitted by the media player device and received by the streaming server can be compared to previously stored authentication data. In such a case the media player device would be authenticated when the correct data is transmitted, and not authenticated otherwise.

At process step 208 the streaming server enables media streaming in those media devices that have been properly authenticated. With the media streaming enabled, media can then streamed from the streaming server to the authenticated media player devices. In a typical use pattern the user of the media player device selects the desired media the media player device transmits that selection to the streaming server. The streaming server can then encode and transmit the selected media via media transmit functions 210. Again, this media can be any suitable type of media, including video and audio media. And again, this media can provided by any suitable content source available at the streaming server. Additionally, such processing and transmitting can include transmitting to the media player devices using any suitable technique or protocol. As one detailed example, the streaming server can transmit an encoded video stream via a content delivery network for distribution the Internet as part of an RSDVR, VOD or other video streaming service. In these and other such embodiments these videos streams are thus received at the media player devices as input media streams.

At process steps 212, the media player devices process the received input media streams for playback at the media player devices. For example, the media player devices process received audio streams to generate sounds. In other examples the media player devices process received video streams for display on a display screen. In this process step a streaming application and/or operating system and/or specialized hardware on the media player device performs typical audio and/or video processing tasks associated with the receiving and displaying of media. For example, these elements can perform various decoding and rendering functions as needed to display a program channel or other video content on a video display device.

At process steps 214, the media player devices generate location data and the location data is transmitted back to the streaming server in location data transmit functions 216. In general, the location data describes the location of the media player device in a suitable data format along with the corresponding time and date. In one typical example the location data is generated by the media player devices at defined intervals (e.g., every minute, every 30 minutes, every hour, daily, etc.). In other embodiments the location data is generated when the signals used to generate the location data are available. The location data can then be transmitted along with the corresponding time and date. In various embodiments the location data can be transmitted when generated, or the location data can be transmitted later (e.g., in batches when the media player application is active). In either case the location data can be stored on the media player devices initially and then transmitted to and stored with the streaming server. For example, the location data can be stored on the streaming server or on a separate system that works with the streaming server to monitor locations, or some combination thereof.

Any suitable technique can be used to generate and transmit the location data. For example, many media player devices can be implemented on mobile smart phones, tablets, laptops and other portable devices that run media player applications. Such devices commonly include receivers for global positioning system (GPS) signals and thus can use GPS to track their location and generate location data. Other devices may use similar satellite location tracking systems. Likewise, phones and other such portable devices can generate location data based on wireless signal strength and/or triangulation and the known location of the transmission stations. Location data can similarly be determined based on the internet protocol (IP) address of the local area network (LAN) that the devices are coupled. Other devices can use nearby beacons or identification of other nearby wireless devices or identification of received radio or television signals to generate the location data. In the case of identifying received radio or television signals, this data could be used to confirm that the device has not spoofed other data, such as IP address via a virtual private network connection, in order to thwart the content protections described herein.

At process step 218 the streaming server monitors the location of the media player devices using the location data received from the media player devices. Specifically, the streaming server monitors locations of the media player devices to determine patterns of device co-location. In general, these patterns of co-location describe when a media player device was co-located with other media player devices. As examples, these patterns can describe when a media player device was co-located with a designated primary device or when a media player device was co-located with a previously confirmed media player device.

In implementing process step 218 a variety of different metrics can be used to identify patterns of device co-location. As one example, the determining of a pattern of device co-location can comprise determining an amount of co-location time between a first media player device and a second media player device over a period of time. In this example the process step 218 can be implemented by tracking the amount of co-location time over a designated period of time and comparing that amount of co-location time to a threshold level. For example, the process step 218 can determine if media player devices have 20 or more hours of co-location time over a week. As other examples, process step 218 can comprise determining if media player devices have 100 or more hours of co-location time over a month. Again, these are just non-limiting examples for how a pattern of co-location between media player devices can be determined.

As another example, the determining of a pattern of device co-location can comprise determining an average of co-location time between a first media player device and a second media player device over multiple periods of time. In this example the process step 218 can be implemented by tracking the amount of co-location time over a multiple designated time periods, determining the average co-location time and comparing that average to a threshold level. For example, the process step 218 can track co-location time over 10 days and determine if media player devices have an average of 6 or more hours of co-location time per day over the 10 days. As other examples, process step 218 can comprise tracking co-location time over 4 weeks and determining if media player devices have an average of 20 hours or more of co-location time per week over the 4 weeks. As other examples, process step 218 can comprise tracking co-location time over 2 months and determining if media player devices have an average of 50 hours or more of co-location time per month over the two months. Again, these are just non-limiting examples for how a pattern of co-location between media player devices can be determined.

As another example, the determining of a pattern of device co-location can comprise determining an amount of co-location time between a first media player device and a second media player device over a ratio of periods of time. In this example the process step 218 can be implemented by tracking the amount of co-location time over a multiple designated time periods, determining the ratio of time periods that the amount of co-location time met or exceeded a threshold level. For example, the process step 218 can track co-location time over 10 days and determine if media player devices have 6 or more hours of co-location time on 7 or more of the 10 days. As other examples, the process step 218 can track co-location time over 6 weeks and determine if media player devices have 30 or more hours of co-location time on 4 or more of the 6 weeks. Again, these are just non-limiting examples for how a pattern of co-location between media player devices can be determined.

At process step 220 the streaming server confirms the media player devices based at least in part on the determined pattern of device co-location. For example, For example, in this process step the determined patterns of device co-location are compared to various criteria of device co-location. Then, those media player devices with patterns of device co-location that meet the criteria are designated as confirmed devices, while media players that do not meet the criteria of device co-location are not so designated. Then, at process step 222 continued media streaming is enabled for the confirmed media player devices.

Those media player devices that are not confirmed can be disabled, suspended, or otherwise prevented from continued media streaming. This disabling of non-confirmed devices can be immediate or delayed based on a variety of factors. In one specific embodiment media player devices are granted a grace period after initial device authentication (processes step 206) to meet the criteria for device co-location. Media player devices that have not met the criteria for device co-location by the time the grace period expires can then be selectively disabled, suspended or others prevented from continued media streaming. For example, in one embodiment each media player device can be allowed 8 weeks from initial authentication in process step 206 before the device is disabled in response to not being confirmed.

With step 222 completed, the process thus returns to the media transmit functions 210 for continued media streaming. Thus, the process flow illustrated in FIG. 2 can be used to confirm and enable media streaming to only those media player devices that meet the criteria for a pattern of co-location. When implemented, this process can be used to reduce the prevalence of illicit media streaming by users with improperly obtained authentication data. Specifically, this process can be used to determine which media player devices that are likely being illicitly used by users not part of the same household and media streaming to such devices can be selectively disabled.

It should be noted that in some embodiments this process flow is continued as long as media streaming continues, with the location of media player devices being continuously monitored and confirmed based on their recent patterns of co-location. Thus, while a device may be originally confirmed based on a pattern of device co-location that same device can be later be made unconfirmed if the pattern of co-location changes.

For example, in some embodiments the media player devices that were previously confirmed may be later designated as non-confirmed if the patterns of device co-location change and no longer meet the criteria for a period of time. Again, such devices that were previously confirmed but are later non-confirmed can then be disabled, suspended, or otherwise prevented from continued media streaming. This disabling of non-confirmed devices again can be immediate or delayed based on a variety of factors. For example, in one embodiment each media player device can be allowed 4 weeks from becoming non-confirmed before the device is disabled in response to not being confirmed. In at least one embodiment, the media player device may provide a prompt to a user explaining that such device's access has been disabled or suspended.

In one example implementation the process flow illustrated in FIG. 2 is first used to confirm media player devices based on a pattern of co-location with a primary media player device. Then, additional media player devices may be confirmed with the process flow based on patterns of co-location with those previously confirmed media player devices. In such an embodiment the primary device serves as the basis by which other media player devices are confirmed, both directly and indirectly.

In these embodiments a variety of techniques can be used to identify the primary device. For example, in some embodiments users may be prompted to select a media player device to be the primary device. In other embodiments, the streaming system may select a media player device to act as the primary device based upon a set of criteria. For example, the streaming system may identify a device as the primary device based on its type (e.g., a 10 foot device) or location (e.g., in the home of the primary user).

In one embodiment, the criteria may be such that a fixed-position media player device is selected as the primary device. The use of a fixed-position media player device as the primary device can in some circumstances be best suited to identify other media player devices as belonging to the same household or other entity. Specifically, because other devices are confirmed based on a pattern of co-location with the primary device, the use of a fixed-position device (e.g., a 10 foot device in the home of the primary user) as the primary device can improve the likelihood that the identified pattern of co-location is the result of being in the same household and not based on some other cause of co-location.

As the term is used herein, a fixed-position media player device is a media player device that is not implemented to be readily mobile during use. For example, a smart television with integrated media player applications would typically be a fixed-position media player device. Media player devices designed to work with traditional televisions are also exemplary fixed-position media player devices. Examples of these fixed-position media player devices would include traditional set-top boxes, DVD or Blu-Ray™ disc players and dedicated streaming devices without integrated display screens such as the AirTV™ player, Amazon Fire TV™ and Roku™ devices. Additionally, some gaming devices without integrated display screens such as Sony Playstation™ and Microsoft X-Box™ can be considered fixed-position streaming devices. Home and multiple dwelling unit gateway devices that receive content and distribute such content to other connected devices are also examples of fixed-position streaming devices. Additionally, traditional desktop computers can be considered fixed-position streaming devices.

In contrast with fixed-position media player devices, mobile media player devices are those devices that are implemented to be readily mobile during use. Examples of such mobile media player devices can include mobile smart phones, tablet computers, laptop computers, and gaming devices with integrated screens. In each case these devices include batteries for power and include integrated display screens that allow these devices to be easily moved. Furthermore, these devices typically include built in wireless networking capability to facilitate streaming without fixed network connection.

Again, in some embodiments a fixed-position media player device is identified and selected to be the primary device for the process flow illustrated in FIG. 2. In this case the fixed-position media player device can be identified and selected as the primary device by the user when prompted by the system. Alternatively, the fixed-position media player device can be identified and selected as the primary device by the streaming system. Again, this use of a fixed-position media player device as the primary device functions as the basis for identifying other devices as belonging to a household or other entity.

With a fixed-position media player device identified as the primary device the process steps 202, 206, 208, 212, 214, 218, 220 and 222 can be performed with the primary device as the first media player device and mobile device(s) as the second media player device. Thus, one or more mobile devices can be confirmed based on patterns of device co-location with the fixed-position media player device designed as the primary device.

This use of the process flow illustrated in FIG. 2 can then be extended to confirm other media player devices based on their pattern of co-location with previously confirmed devices. Specifically, by performing process steps 202, 206, 208, 212, 214, 218, 220 and 222 with a second media player device that was previously confirmed and a third media player device, the third media player device can be selectively confirmed. This expanded process allows other media player devices to be confirmed under certain criteria even when those other devices do not have pattern of co-location with the primary media player device.

In such an embodiment it may be desirable to only confirm other media player devices that are fixed-position media player devices and not to confirm other mobile media player devices in this manner. This can avoid an undesirable outcome where one confirmed mobile media player device is allowed to confirm a large number of other mobile media player devices. For example, this can avoid the undesirable outcome where a confirmed mobile media player device is used to subsequently confirm mobile devices belonging to numerous coworkers sharing office space.

Figure 3:
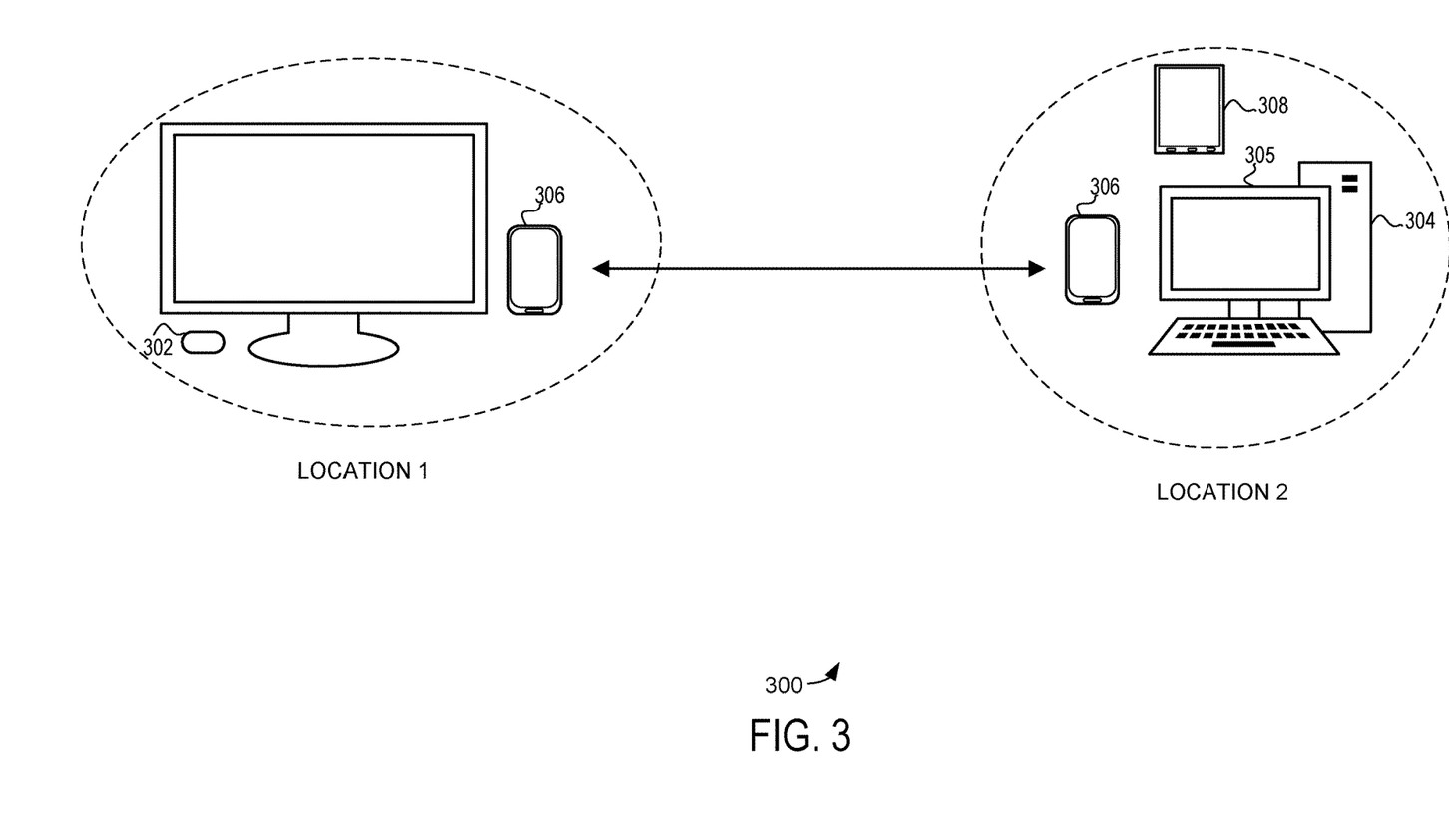
FIG. 3 is a schematic view of media player devices at two locations in accordance with an embodiment.

Turning now to FIG. 3, an exemplary use case 300 is illustrated. The use case 300 includes media player devices at two locations, e.g., location 1 and location 2. Specifically, the use case 300 includes a first fixed-position media player device 302 at location 1. In this example the first fixed-position media player device 302 is a streaming device that plays streamed media content on an associated television 303. The use case 300 further includes a second fixed-position media player device 304 at location 2. In this example the second fixed-position media player device 304 is a desktop computer that includes a separate display screen 305. The use case 300 also includes a first mobile media player device 306 and a second mobile media player device 308. In this example the first mobile media player device 306 is a smart phone with an integrated display, and the second mobile media player device 308 is a tablet computer with an integrated display. As shown in FIG. 3, the first mobile media player device 306 moves between location 1 and location 2. However, the second mobile media player 308 does not spend large amounts of time at location 2.

To facilitate media streaming each of the first fixed-position media player device 302, second fixed-position media player device 304, first mobile media player device 306 and second mobile media player device 308 provide authentication data (e.g., user ID and password) to the streaming server and are initially enabled to receive streaming media from a streaming server (not shown in FIG. 3). The media player devices can then process and display video, generate audio, etc., depending up on the type of media steaming being provided.

In accordance with the embodiments described herein, the location of the various media player devices can be monitored during such initial streaming to determine a pattern of device co-location, and the media player devices can then each be selectively confirmed or not confirmed based on their determined pattern of device co-location with a primary media player device. Those media player devices that are designated as confirmed devices based on a pattern of co-location can then be enabled for continued media streaming, while media player devices that are not designated as confirmed devices based on a pattern of co-location are prevented from continuing to receive media streams from the streaming server.

In this example the first fixed-position media player device 302 is designated as the primary device. Location data is then generated for the media player devices during an initial period in which media streaming is enabled. For example, the location of the first mobile media player device 306 is monitored during an initial period to determine a pattern of co-location with the primary device. Then, based on the pattern of co-location with the primary device the first mobile media player device 306 is confirmed or not confirmed. As one example, the first mobile media player device 306 is confirmed in response to the first mobile media player device 306 being determined to be co-located with the primary device (i.e., the first fixed-position media player device 302) for an average at least 4 hours per day over 14 days. In response to this confirmation, media streaming from the streaming server to the first mobile media player device 306 is continued to be enabled.

With the confirmation of mobile media player device 306, other devices can then be confirmed based on a pattern of co-location with that confirmed device even if they do not have a sufficient pattern of co-location with the primary device. Specifically, in this illustrated example the locations of the second fixed media player device 304 and the second mobile media player device 304 can both be monitored to determine patterns of co-location with the confirmed first mobile media player device 306. Again, those media player devices that meet criteria of device co-location can be designated as confirmed devices, while media players that do not meet the criteria of device co-location are not confirmed. As one specific example, the second fixed position media player device 304 and the second mobile media player device 308 can be confirmed in response to being determined to be co-located with a non-primary confirmed device (the first mobile media player device 306) for an average at least 4 hours per day over 14 days. Again, this is just one example of the criteria that can be used to determine a pattern of device co-location.

However, as was described above, when confirming devices based on a pattern of co-location with non-primary device it can be desirable to only confirm other media player devices that are fixed-position media player devices and to not confirm other mobile media player devices. This can prevent undesirable outcomes where one confirmed mobile media player device is allowed to confirm a large number of other mobile media player devices.

For example, if location 1 is a home location and location 2 is an office location it can be desirable to prevent co-location with the first mobile media player device 306 at location 2 for being used as a basis for confirming other mobile media player devices. Otherwise, the mobile media player devices belonging to large numbers of coworkers could be undesirably confirmed. To avoid this, the system can be implemented to only confirm fixed-position media player devices (e.g., second fixed-position media player device 304) based on a pattern of co-location with a non-primary device (e.g., first mobile media player device 306) and not confirm mobile media player devices (e.g., second mobile media player device 308) based on the same criteria. Again, this is just one example implementation and other implementations with different criteria are possible.

In additional variations on the techniques described above a variety of other factors can be considered in determining whether to selectively enable or disable media streaming. For example, in one embodiment media streaming to media player devices can be selectively enabled for non-confirmed devices based at least in in part on a location type of the media player device. Thus, when the media player device is at certain types of locations the streaming to non-confirmed devices is not suspended due to a continued lack of device co-location. Examples of the types of locations for which streaming can be enabled to non-confirmed devices include educational institutions and vacation locations.

Thus, as one example, this variation can allow a member of the household to take a streaming media device to an education establishment (e.g., college and university) and continue media streaming even if a pattern of device co-location with the primary device no longer is present. As another example, a member of the household to take a streaming known vacation rental establishment (e.g., hotel or resort) and continue media streaming even if a pattern of device co-location with the primary device no longer is present.

In yet additional variations on the techniques described above the selective designating of media player devices in the plurality of media player devices as confirmed devices can be based at least in part on a reduced pattern of device co-location responsive to a location type of the media player device comprising an educational institution or a vacation location. Thus, in these embodiments the amount of co-location needed for device confirmation is reduced when the media player device is at such location types. This variation can again allow a member of the household to take a streaming media device to an education establishment or vacation rental and continue media streaming based on a reduced criteria for device co-location.

Figure 4:
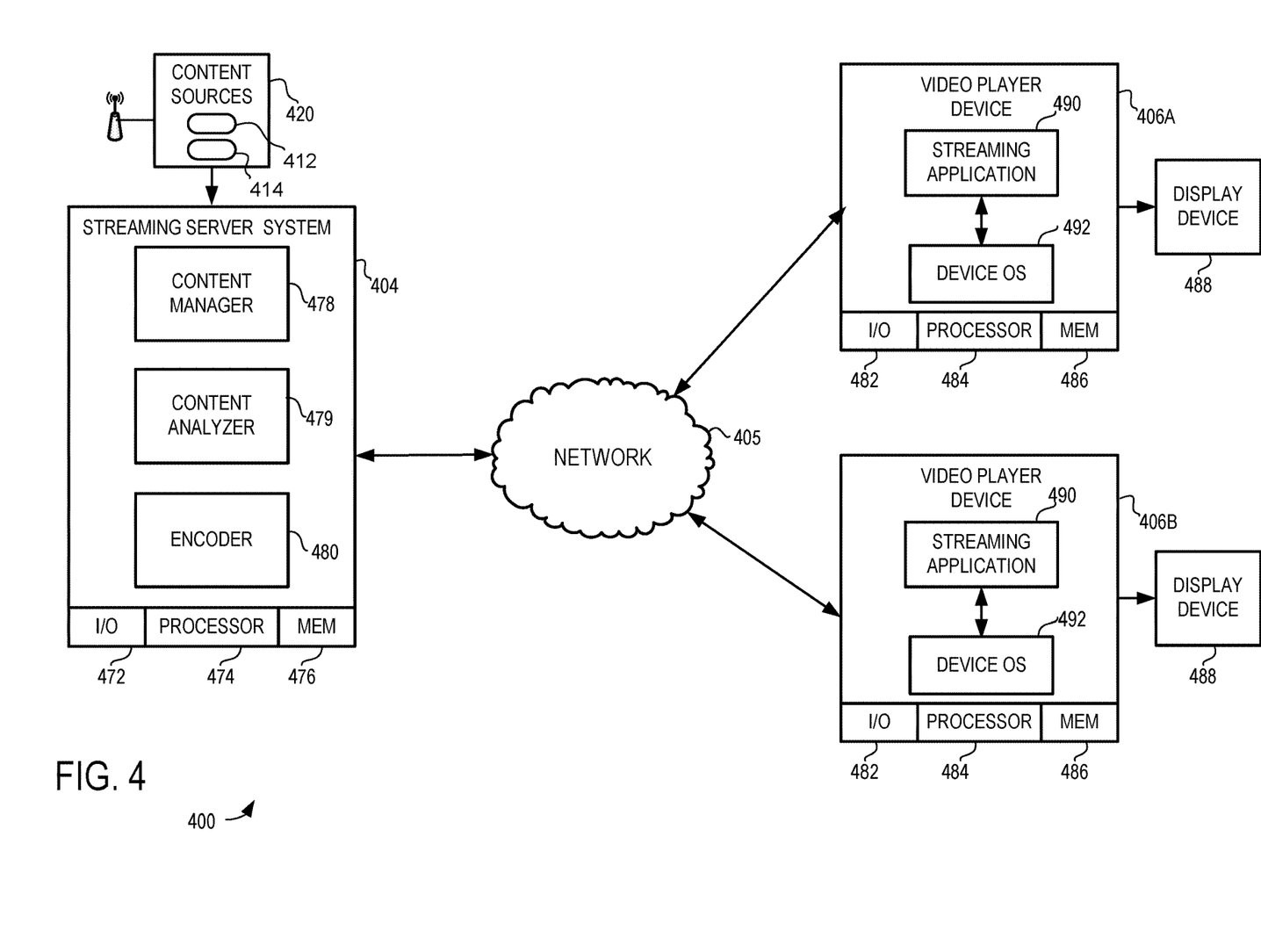
FIG. 4 is a detailed diagram of one example implementation of a streaming media system.

Turning now to FIG. 4 a video streaming system 400 suitably includes a streaming server system 404 and a plurality of video player devices 406A-B. In general, the streaming server system 404 receives video content from one or more content sources 420, and transmits that video content through the network 405 to the video player devices 406A-B in the form of a video stream that can be received, processed, and displayed at the video player devices 406A-B. The video streaming system 400 is an example of the type of system that can be implemented to include the media player device authentication techniques described above. For example, the video streaming system 400 can be used to implement the process flow illustrated in the process flow diagram 200 of FIG. 2.

In general, the content sources 420 can be any type of video content source, including media providers, content aggregators or distributors such as a cable television system operator, a direct broadcast satellite (DBS) system operator, or simply a network service provider or the like. The streaming server system 404 processes the received content into a suitable format streaming to the video player devices 406A-B. To facilitate this, the streaming server system 404 includes at least an I/O 472, a processor 474, and a memory 476. Additionally, the streaming server system 404 includes a content manager 478, a content analyzer 479, and an encoder 480.

In general, each of the video player devices 406A-B includes a combination of hardware and/or software needed to receive, process, and play the video streams received from the streaming server system 404. For example, each of the video player devices includes an I/O 482, a processor 484, a memory 486, and a display device 488. Furthermore, each of the video player devices 406A-B includes a streaming application 490 and a device OS 492 residing in memory 486 and being executed by the processor 484. As some specific examples, each of the video player devices 406A-B can be implemented with any suitable computing device, including laptops, tablets and mobile communication devices (e.g., smart phones). Such devices may include an integrated display device 488, or may be coupled to a separate display device 488.

In accordance with the embodiments described herein the video player devices 406A-B and streaming server system 404 are configured to implement a media player device authentication technique that monitors the locations of video player devices 406A-B to determine a pattern of device co-location with a primary device. To facilitate this, the streaming the applications 390 can include programs to track device location and transmit that location data to the streaming server system 404. This location data can be provided to the video player devices 406A-B from a variety of sources, including GPS and internet based location determination. The video player devices 406A-B can then be selectively designated as confirmed devices based on their determined pattern of device co-location with a primary media player device. Those video player devices 406A-B that are designated as confirmed devices can then be selectively enabled for video streaming. Conversely, video player devices 406A-B that are not designated as confirmed devices based on a pattern of co-location can be prevented from receiving video streams even when they have the correct login information and password.

The content sources 420 can include content from a content aggregator or distributor such as a cable television system operator, a direct broadcast satellite (DBS) system operator, a streaming media provider, or simply a network service provider or the like. Other embodiments could provide the features described herein using conventional computing machinery (e.g., physical or cloud based servers) by parties that may or may not be interested in re-distributing the received content, as desired.

In various embodiments, television signals for one or more networks, channels or the like are received in any format by the system operator via satellite, fiber optic or any other conventional wireless or physical media for transmitting television signals. The signals are received, demodulated and decoded as needed by any appropriate receiver(s) to extract program signals that represent the decoded television program stream. Alternately or additionally, content sources 420 may receive content directly from a broadcaster, distributor or other source, as desired.

In a typical embodiment the received programming signals are analyzed as appropriate to identify the program contents. For example, the content analyzer 479 can be implemented to analyze audio and/or video content in the programming signals. Such a system can be used to recognize advertisements (e.g., commercials) or other portions of the underlying content. In a typical embodiment, the content analyzer 479 executes a software application that performs the analysis based upon the audio and/or video content received. In various embodiments, content analyzer 679 may consider average zero crossing rate, average spectrum, spectral flatness, prominent tones across a set of frequency bands, bandwidth and/or any other characteristics of the audio or video signal. Other embodiments could equivalently perform a temporal analysis in addition to or in place of frequency analysis. Such a temporal analysis could, for example, identify peak (or peak RMS) values in the time domain signal to find beats (e.g., in music) or other times between peak values that can uniquely identify the content. This temporal analysis could be combined into a fingerprint or signature in any way, or could be considered separately from other factors. Many different audio and video fingerprinting or other automated analysis programs could be used in any number of other embodiments.

The extracted content data may be compared to data previously stored in a database, as appropriate, to identify portions of content in the program stream. Commercials, for example, can be recognized when the audio portions of the program stream contain similar data to known audio data stored in a database. Such a database may make use of conventional database software, or the database may be a custom database developed to store content recognition data, as desired. Such a database may reside on the same computing hardware as the streaming server system 404, or separate computing resources could be provided, including any sort of cloud-based computing resources.

In one specific embodiment, the content analyzer 479 is configured to recognize scene changes in the underlying content. When a different scene is identified in the content analyzer 479 attempts to recognize the scene based upon digital analysis of the audio and/or video. If the scene already exists in the database, then a new occurrence of the recognized scene can be recorded in the database or elsewhere. If the scene is not recognized, then a new entry in the database may be created to identify subsequent occurrences of the same scene. To that end, a digital "signature" or "fingerprint" of the scene is stored for subsequent analysis. Content may be initially recognized based upon information supplied by human data entry (e.g., crowdsourced data, or data entered by a technician), or by data supplied by a content source (e.g., an advertiser, broadcaster or network), and/or from any other source as desired. Content analyzer 479 is therefore able to identify advertisements or other contents of the received television broadcasts and other video though analysis of the underlying audio or video content.

In many implementations, content identification is performed by the content analyzer 479 in parallel for multiple channels that may be simultaneously received for content aggregation, for collection of advertising data, or for any other purpose. A distributor/aggregator, for example, may encode the extracted signals for distribution on a digital network, for aggregation and redistribution of signals over a DBS or cable distribution system, for generating content stored on a RSDVR or VOD service, or for any other purpose. Content identification could be performed while the content is being processed for redistribution. Alternately, content could be stored for subsequent analysis, as desired.

In some embodiments the content analyzer 479 can perform content analysis in parallel with the encoding provided by the encoder 480. The encoder 480 can encode live broadcast signals and other such video content for adaptive streaming on the network 405 and/or for broadcast via cable, direct broadcast satellite, terrestrial broadcast, and/or the like. Encoder 480, for example, can be used to encode signals into a suitable format for broadcast via cable, DBS, or the like. Such broadcasts may be ultimately received by video player devices 406A-B via the network 405 or the like. In one specific example, the encoder 480 suitably encodes programs contained within signals from the content sources 420 into one or more adaptive streams that each representing a media program in its entirety, but with different bit rates, frame rates, resolution and/or other levels of quality. Typically, each stream is made up of smaller segments that each represent a small portion of the program content with a single data file. Each stream is typically encoded so that segments of the different streams are interchangeable with each other, often using a common timing index. This allows a client video player devices 606A-B to mix and match segments from different streams to create a media stream that effectively adapts as network conditions or other conditions change. Since the segments are typically stored as separate files, segment requests may take the form of conventional hypertext transport protocol (HTTP) constructs (e.g., HTTP "get" instructions) or the like. Such constructs are readily routable on network 605 and can be served by conventional CDN or other web-type servers, thereby providing a convenient mechanism for distributing adaptive media streams to a variety of different client devices on network 405.

Again, other embodiments may use different encoders for the encoder 680. Still other embodiments may omit the encoding function entirely and perform audio analysis or other content recognition separately from the distribution function. Since many distributors already receive program signals for encoding, there may be an economy of scale in performing the content recognition function at the same time. Other embodiments could nevertheless use different encoding or streaming structures or techniques, as desired, or content could be equivalently aggregated and/or broadcast via satellite, cable, terrestrial broadcast, non-adaptive media stream and/or the like. As noted above, it is not necessary that the analyzed content be re-broadcast or re-distributed by the analyzing party in all embodiments. It may be sufficient for many purposes to simply gather data for recognizing advertisements or other portions of the content, for analyzing or further processing information about the recognized advertisements and/or for taking other actions as desired without necessarily re-broadcasting or redistributing the content itself.

Content manager 478 is provided to manage and distribute electronic program guide (EPG) data and other information about the programs that are distributed within streaming server system 404. The content manager 478 may also be implemented to process information relating to advertisements or other portions of the content stream, to associate actions to be performed by the viewer and/or the playback device based upon the content of the stream, and/or for any other purpose.

The data maintained by the content manager 478 could include channel information and timing information about each entry so that the particular content can be readily identified. Other embodiments may use different identification data, such as distributor or network information, or any other information as desired. Some implementations may incorporate conventional EPG data (e.g., data obtained from a vendor or other source), while other implementations may use channel and time so that even portions of a program can be individually identified. Commercials and other advertisements, for example, could be referenced by their channel and broadcast time so that additional actions unique to those advertisements could be enabled. Other embodiments could use different timing references (e.g., references to MPEG presentation time stamps (PTS) in the underlying content, references to event anchors in the content itself, and/or any other timing references) as desired.

In various embodiments, data including information obtained from the content analysis is provided to the video player devices 406A-B. This data could be formatted in any manner. In various embodiments, data could include action data and/or identification data as tags or the like in an XML-type format. Again, many other embodiments could incorporate any number of additional or alternate features to take advantage of the real-time identification feature provided by the broadcaster.

The various concepts and examples described herein may be modified in any number of different ways to implement equivalent functions and structures in different settings. The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process performed by a media player device, the automated process comprising:

designating a first media player device as a primary device;

monitoring locations of a plurality of media player devices to determine patterns of device co-location with the primary device for the plurality of media player devices, where the determined patterns include determined amounts of time each of the plurality of media player devices is co-located with the primary device over at least one defined time period, the plurality of media player devices including a second media player device;

selectively designating the second media player device in the plurality of media player devices as a confirmed device responsive to a corresponding pattern of device co-location with the primary device meeting first criteria for device co-location, the first criteria specifying at least a minimum number of days that the device is co-located with the primary device over the at least one time period; and selectively enabling media streaming to the second media player device if the second media player device is one of the confirmed devices in the plurality of media player devices, and not enabling media streaming to other devices in the plurality of media player devices that do not meet the first criteria for device co-location even if users of the other media player devices provide valid authentication credentials.

2. The automated process of claim 1 wherein the first media player device is a mobile media player device and the second media player device is a fixed-position media device.

3. The automated process of claim 1 wherein the monitoring locations of a plurality of media player devices to determine the patterns of device co-location comprises determining an average of co-location time between at least the first media player device and the second media player device over multiple of the at least one defined time period.

4. The automated process of claim 1 wherein the monitoring locations of a plurality of media player devices to determine the patterns of device co-location comprises determining an amount of co-location time between at least the first player device and the second player device over a ratio of multiple of the at least one defined time period.

5. The automated process of claim 1 further comprising monitoring locations of the plurality of media player devices to determine a pattern of device co-location between the second media player device and a third media player device, and further comprising selectively designating the third media player device as a confirmed device responsive to the determined pattern of device co-location between the second media player device and the third media player device meeting the first set of criteria for device co-location and the second media player device having been previously confirmed.

6. The automated process of claim 5 wherein the second media player device is a mobile media player device and further comprising confirming the third media player device responsive to the third media player device being a fixed-position media player device.

7. The automated process of claim 6 further comprising not confirming the third media player device responsive to the third media player device being a mobile media player device.

8. The automated process of claim 1 further comprising selectively enabling media streaming to non-confirmed devices in the plurality of media player devices based at least in part on a location type of the media player device.

9. The automated process of claim 1 further comprising selectively enabling media streaming to non-confirmed devices in the plurality of media player devices responsive to a location type of the media player device comprising an educational institution or a vacation location.

10. The automated process of claim 1 wherein the selectively designating media player devices in the plurality of media player devices as confirmed devices responsive to a corresponding pattern of device co-location with the primary device meeting first criteria for device co-location comprises utilizing reduced criteria of device co-location responsive to a location type of the media player device comprising an educational institution or a vacation location.

11. The automated process of claim 1 wherein the monitoring locations of each of a plurality of media player devices to determine a pattern of device co-location for the plurality of media player devices utilizes at least one of global positioning system (GPS), internet protocol (IP) address, and wireless signal location.

12. The automated process of claim 1 further comprising selectively disabling streaming to media player devices in the plurality of media player devices that are not confirmed after period of time from initial use.

13. An authentication server in communication with a plurality of media player devices over a network, the authentication server comprising a processor and a memory, wherein the processor is configured to perform an automated process by executing digital instructions stored in the memory, wherein the automated process comprises:

designating a first media player device as a primary device;

monitoring locations of a plurality of media player devices to determine patterns of device co-location with the primary device for the plurality of media player devices, where the determined patterns include determined amounts of time each of the plurality of media player devices is co-located with the primary device over at least one defined time period, the plurality of media player devices including a second media player device;

selectively designating the second media player device in the plurality of media player devices as a confirmed device responsive to a corresponding pattern of device co-location with the primary device meeting first criteria for device co-location, the first criteria specifying at least a minimum number of days that the device is co-located with the primary device over the at least one time period; and selectively enabling media streaming to the second media player device if the second media player device is one of the confirmed devices in the plurality of media player devices, and not enabling media streaming to other devices in the plurality of media player devices that do not meet the first criteria for device co-location even if users of the other media player devices provide valid authentication credentials.

14. The authentication server of claim 13 wherein the monitoring locations of a plurality of media player devices to determine patterns of device co-location comprises determining an amount of co-location time between at least the first player device and the second player device over the at least one defined time period.

15. The authentication server of claim 13 further comprising monitoring locations of the plurality of media player devices to determine a pattern of device co-location between the second media player device and a third media player device, and further comprising selectively designating the third media player device as a confirmed device responsive to the determined pattern of device co-location between the second media player device and the third media player device meeting the first set of criteria for device co-location and the second media player device having been previously confirmed.

16. The authentication server of claim 15 wherein the second media player device is a mobile media player device and further comprising confirming the third media player device responsive to the third media player device being a fixed-position media player device.

17. The authentication server of claim 16 further comprising not confirming the third media player device responsive to the third media player device being a mobile media player device.

18. The authentication server of claim 16 further comprising not confirming the third media player device responsive to the third media player device being a mobile media player device.

19. An automated process executable by a streaming server in communication with media player devices over a network, the automated process comprising:
designating a fixed-position media player device as a primary device;
determining a location of the primary device;
monitoring locations a plurality of mobile media player devices to determine patterns of device co-location with the primary device, where the determined patterns include determined amounts of time each of the plurality of media player devices is co-located with the primary device over at least one defined time period;
selectively designating one of the mobile media player devices in the plurality of mobile media player devices as a second confirmed mobile device responsive to at least one determined pattern of device co-location with the primary device meeting first criteria for device co-location;
monitoring locations of the other devices to determine patterns of device co-location with the second media player device to determine patterns of device co-location with the second media player device;
selectively designating a third device of the other devices as a confirmed fixed-position device responsive to at least one determined pattern of device co-location with the second fixed-position media player device meeting second criteria for device co-location, wherein the second criteria is different from the first criteria; and
selectively enabling streaming to the second and third devices while selectively disabling streaming to other media player devices in the plurality of media player devices that are not confirmed after period of time from initial use even if users of the other media player devices provide valid authentication credentials.

20. The automated process of claim 19 wherein the third device is a media streaming device located in a different location than the primary media player device, and wherein the second criteria allows less co-location time than the first criteria.

\* \* \* \* \*